US010783608B2

(12) United States Patent
Diasparra

(10) Patent No.: US 10,783,608 B2
(45) Date of Patent: Sep. 22, 2020

(54) METHOD FOR PROCESSING SIGNALS FROM A MATRIX FOR TAKING COLOUR IMAGES, AND CORRESPONDING SENSOR

(71) Applicant: Teledyne e2v Semiconductors SAS, Saintg Egrève (FR)

(72) Inventor: Bruno Diasparra, Seyssins (FR)

(73) Assignee: TELEDYNE E2V SEMICONDUCTORS SAS, Saint Egreve (FR)

( * ) Notice: Subject to any disclaimer, the term of this patent is extended or adjusted under 35 U.S.C. 154(b) by 104 days.

(21) Appl. No.: 15/780,339

(22) PCT Filed: Nov. 29, 2016

(86) PCT No.: PCT/EP2016/079139
§ 371 (c)(1),
(2) Date: May 31, 2018

(87) PCT Pub. No.: WO2017/093253
PCT Pub. Date: Jun. 8, 2017

(65) Prior Publication Data
US 2018/0365801 A1    Dec. 20, 2018

(30) Foreign Application Priority Data
Dec. 1, 2015  (FR) ...................................... 15 61646

(51) Int. Cl.
*H04N 9/04* (2006.01)
*G06T 3/40* (2006.01)
(52) U.S. Cl.
CPC ........... *G06T 3/4015* (2013.01); *H04N 9/045* (2013.01); *H04N 9/04557* (2018.08); *H04N 2209/046* (2013.01)
(58) Field of Classification Search
USPC ......................... 382/162–167, 205, 276–286
See application file for complete search history.

(56) References Cited

U.S. PATENT DOCUMENTS 5,990,950 A * 11/1999 Addison ............... G06T 3/4015
348/273
8,873,847 B2   10/2014 Alacoque
(Continued)

FOREIGN PATENT DOCUMENTS

WO    2015083502 A1    6/2015

OTHER PUBLICATIONS

International Search Report and Written Opinion for PCT/EP2016/079139, dated Jan. 31, 2017.

*Primary Examiner* — Dwayne D Bost
*Assistant Examiner* — Stephen M Brinich
(74) *Attorney, Agent, or Firm* — Piloff Passino & Cosenza LLP; Sean A. Passino; Rachel K. Pilloff

(57) ABSTRACT

The invention relates to the processing operation of interpolating the colours of a Bayer mosaic image sensor. A first elementary matrix filter, which is a bilinear interpolation filter, of size m×m, m being an odd number larger than or equal to 3, a low-pass matrix filter of size n×n, n being an odd number larger than or equal to 3, and a high-pass matrix filter, complementary to the low-pass filter, of size n×n, are defined. The first matrix filter is convoluted with the low-pass filter, resulting in a low-frequency interpolation filter of size (m+n−1)×(m+n−1), and the first matrix filter is convoluted with the high-pass filter, resulting in a high-frequency interpolation filter of size (m+n−1)×(m+n−1). The matrix of digital signals arising from the pixels is filtered separately, using the pixels of each colour, by the low-frequency interpolation filter. The complete matrix of signals is filtered using the high-frequency interpolation filter. The result of the low-frequency filtering operation and the result of the high-frequency filtering operation are added together, for each pixel, in order to obtain a numerical value of a given colour of that pixel.

9 Claims, 3 Drawing Sheets

(56) References Cited

U.S. PATENT DOCUMENTS

2002/0041761 A1\* 4/2002 Glotzbach .................. G06T 1/60
   396/429
2003/0025814 A1 2/2003 Hunter et al.
2003/0202113 A1\* 10/2003 Yoshikawa ............ G06T 3/4015
   348/272
2004/0028271 A1 2/2004 Pollard et al.
2017/0280122 A1\* 9/2017 Sato ......................... H04N 9/07

\* cited by examiner

Filtering HF $V_R = R_1 + W$
$V_G = (G_1)/2 + W$
$V_B = B_1 + W$

FIG. 3

METHOD FOR PROCESSING SIGNALS FROM A MATRIX FOR TAKING COLOUR IMAGES, AND CORRESPONDING SENSOR

TECHNICAL FIELD

The invention relates to colour image sensors composed of a mosaic of light-sensitive pixels, referred to as colour pixels, each collecting a signal representing a component of light received by this pixel in the colour associated with the pixel.

PRIOR ART

The mosaic of pixels most often comprises pixels of three complementary colours—red, green and blue—but it could also be composed of the colours magenta, cyan and yellow. The invention will be described under the assumption that the colours are red (R), green (G) and blue (B). The mosaic is often a Bayer mosaic comprising twice as many green pixels as blue or red pixels. In practice, the pixels are covered by filters of the colour in question so as to collect only the light in the component of this colour. In certain arrangements, white pixels (not covered by filters) and/or "black" pixels (letting only infrared light through) may be distributed in the matrix, in addition to the colour pixels.

Red pixels do not deliver signals representing the green and blue components of light received by these pixels; instead, the neighbouring, green and blue, pixels are used to provide an approximation of the green and blue component that is received by the red pixel. The same applies to the blue or green pixels, for which it is possible to estimate, by virtue of the neighbouring pixels, the components of light that they do not detect.

It is therefore common practice to reconstruct, from the signals delivered by all of the pixels of the sensor, a complete image in which each image point associated with a pixel is represented by three levels of light, red, green and blue, respectively, even if the pixel detects only one colour.

This reconstruction is carried out by an interpolation function, which may be simple or complex: linear interpolation and bilinear interpolation are the simplest functions. In the simplest linear interpolation function, a numerical value for a second colour is assigned to a first pixel detecting a first colour, by taking the mean of the signals delivered by two pixels of the second colour which are closest to the first, either vertically or horizontally. In the simplest bilinear interpolation function, a block of nine pixels centred on the first pixel is used, and a weighting coefficient is assigned to each pixel of the block depending on its distance from the centre pixel. Interpolation from a block of 5×5 pixels is also possible. The interpolation function is then a filtering function represented by a matrix of 3×3 or 5×5 coefficients.

Lastly, more sophisticated interpolation functions, such as cubic interpolation, are possible, but they require substantial amounts of computing power and substantial amounts of computing memory.

Most of the simple interpolation functions are low-pass filtering functions, which have the flaw of producing moiré effects. These moiré effects result from the fact that the pixels of one determined colour are distributed with a pitch that is smaller than the pitch of the pixels of the sensor. Typically, if the pitch of the pixels in rows and in columns is P, the pitch of the green pixels (generally twice as numerous as the red pixels and the blue pixels) will be 2P in rows and in columns and the pitch of the red pixels or the blue pixels will be 3P. The spatial sampling of the points of the image is therefore a sub-sampling operation for each colour, while the reconstructed final image is an image with points at pitch P. This sub-sampling operation produces spectral aliasing during the interpolation processing operation and this generates artefacts (false colours) in places where the image contains abrupt spatial variations in intensity or colour.

Patent US2003/0025814 proposes an interpolation function based on bilinear interpolation and low-pass filtering, to calculate the three low-frequency colour components corresponding to each pixel, and adding to each one a high-frequency component that depends only on the colour of the pixel in question, obtained by subtracting the value of the coloured signal delivered by the pixel from the interpolated value of the corresponding colour component.

SUMMARY OF THE INVENTION

The invention is based on the observation that in an ordinary image, it is generally the luminance, rather than the chrominance, that exhibits the most spatial variation in the image. Stated otherwise, the variations in quantities of light between one image point and a neighbouring point are generally larger than the variations in colour between one image point and a neighbouring point.

If this is indeed the case, it may be considered that the details at high spatial frequency have few variations in colour while having large variations in luminance. The spectrum of spatial frequencies of the luminance of the image will most often be a spectrum with few low-frequency components, while the spectrum of spatial frequencies of the chrominance will most often be a spectrum with few high-frequency components.

It is proposed, according to the invention, to establish an interpolation function that takes this particularity into account. To this end, two different interpolation filters are produced, one adapted to the interpolation of each of the colour components, the other adapted to the interpolation of the pixels independently of their colour, and, for each colour, the result of the interpolation by the second filter is added to the result of the interpolation by the first filter, this being done for each colour. The filter adapted to the interpolation of the colour components is a filter whose function is more of a low-pass function. The filter adapted to the interpolation of the pixels independently of their colour is a filter whose function is more of a high-pass function.

More specifically, the invention proposes a method for processing the image delivered by a colour image sensor comprising a mosaic of N coloured pixels arranged in a regular geographic distribution of three colours in which each pixel is associated with one point of the image to be established, each pixel delivering a digital signal whose value represents the luminance component of an image point in the colour corresponding to that pixel, the signals arising from the N pixels being arranged in a matrix of signals and the image processing operation comprising a calculation of interpolating signals of the matrix, allowing each image point to be given three numerical values of luminance components corresponding to the three colours, respectively, while the pixel corresponding to that image point delivers a signal corresponding to a single colour, method characterized in that it comprises the following steps:

defining a first elementary matrix filter, which is a bilinear interpolation filter, of size m×m, m being an odd number larger than or equal to 3;

defining a low-pass matrix filter of size n×n, n being an odd number larger than or equal to 3;

defining a high-pass matrix filter, complementary to the low-pass filter, of size n×n;

convoluting the first matrix filter with the low-pass filter, resulting in a low-frequency interpolation filter of size (m+n−1)×(m+n−1);

convoluting the first matrix filter with the high-pass filter, resulting in a high-frequency interpolation filter of size (m+n−1)×(m+n−1);

filtering the matrix of digital signals, using the pixels of the first colour only, with the low-frequency interpolation filter, filtering the matrix of signals, using the pixels of the second colour only, with the low-frequency interpolation filter, and filtering the matrix of signals, using the pixels of the third colour only, with the low-frequency interpolation filter, these three filtering operations resulting in a first intermediate numerical value being given to each point of the image for each of the colours;

filtering the entire matrix of signals with the high-frequency interpolation filter, in order to establish a second intermediate numerical value for each point of the image;

adding, for each pixel, in order to obtain a numerical value of a given colour of that pixel, the first intermediate numerical value corresponding to that pixel and to that colour and the second numerical value corresponding to that pixel.

The first elementary matrix filter is preferably a filter represented by the following matrix:

$$\begin{bmatrix} 1/4 & 1/2 & 1/4 \\ 1/2 & 1 & 1/2 \\ 1/4 & 1/2 & 1/4 \end{bmatrix}$$

The low-pass matrix filter is preferably a simple mean filter, of size 3×3, and is represented by the following matrix:

$$\begin{bmatrix} 1/9 & 1/9 & 1/9 \\ 1/9 & 1/9 & 1/9 \\ 1/9 & 1/9 & 1/9 \end{bmatrix}$$

and the high-pass filter is preferably represented by the following matrix:

$$\begin{bmatrix} -1/9 & -1/9 & -1/9 \\ -1/9 & 8/9 & -1/9 \\ -1/9 & -1/9 & -1/9 \end{bmatrix}$$

In the case in which the pixels of one determined colour have a pitch of geographic distribution that is twice smaller than the pitch of the pixels of the other colours, the filtering of the matrix of pixels using the pixels of this determined colour with the low-frequency interpolation filter comprises a division by two in order to deliver the first intermediate value for that colour. This will be the case for filters organized in a Bayer mosaic which have twice as many green pixels as red pixels and blue pixels.

In the preferred implementation of the method according to the invention:

a low-frequency interpolation filter of size 5×5 is defined, represented by the following matrix:

$$\begin{bmatrix} 1/36 & 3/36 & 4/36 & 3/36 & 1/36 \\ 3/36 & 9/36 & 12/36 & 9/36 & 3/36 \\ 4/36 & 12/36 & 16/36 & 12/36 & 4/36 \\ 3/36 & 9/36 & 12/36 & 9/36 & 3/36 \\ 1/36 & 3/36 & 4/36 & 3/36 & 1/36 \end{bmatrix}$$

a high-frequency interpolation filter of size 5×5 is defined, represented by the following matrix:

$$\begin{bmatrix} -1/36 & -3/36 & -4/36 & -3/36 & -1/36 \\ -3/36 & 0 & 6/36 & 0 & -3/36 \\ -4/36 & 6/36 & 20/36 & 6/36 & -4/36 \\ -3/36 & 0 & 6/36 & 0 & -3/36 \\ -1/36 & -3/36 & -4/36 & -3/36 & -1/36 \end{bmatrix}$$

the matrix of digital signals is filtered, using the pixels of the first colour only, with the low-frequency interpolation filter, the matrix of signals is filtered, using the pixels of the second colour only, with the low-frequency interpolation filter, and the matrix of signals is filtered, using the pixels of the third colour, with the low-frequency interpolation filter, these three filtering operations resulting in a first intermediate numerical value being given to each point of the image for each of the colours;

then the entire matrix of digital signals is filtered with the high-frequency interpolation filter, in order to establish a second intermediate numerical value for each point of the image;

and, for each pixel, in order to obtain a numerical value of a given colour of that pixel, the first intermediate numerical value corresponding to that pixel and to that colour and the second numerical value corresponding to that pixel are added together.

The invention also relates to an image sensor comprising the digital processing means allowing the method to be implemented. The term "image sensor" may refer to:

either a component comprising a matrix of pixels with an image processing operation according to the invention embedded within this component;

or a set of components among which are a component comprising a matrix of pixels and certain image processing operations, and an additional component carrying out the processing operation according to the invention;

or a component, or a set of components, and a processor (PC, computer) receiving, from the component or from the set of components, signals representing the image and carrying out the processing operation according to the invention.

BRIEF DESCRIPTION OF THE DRAWINGS

Other characteristics and advantages of the invention will become apparent upon reading the detailed description which follows, given with reference to the appended drawings in which:

FIG. 1 shows a typical matrix of colour pixels, referred to as a Bayer matrix;

FIG. 2 shows the step of low-frequency interpolation filtering;

FIG. 3 shows the step of high-frequency interpolation filtering and the step of adding the results of the two interpolation filtering operations.

DETAILED DESCRIPTION

Figure 1:
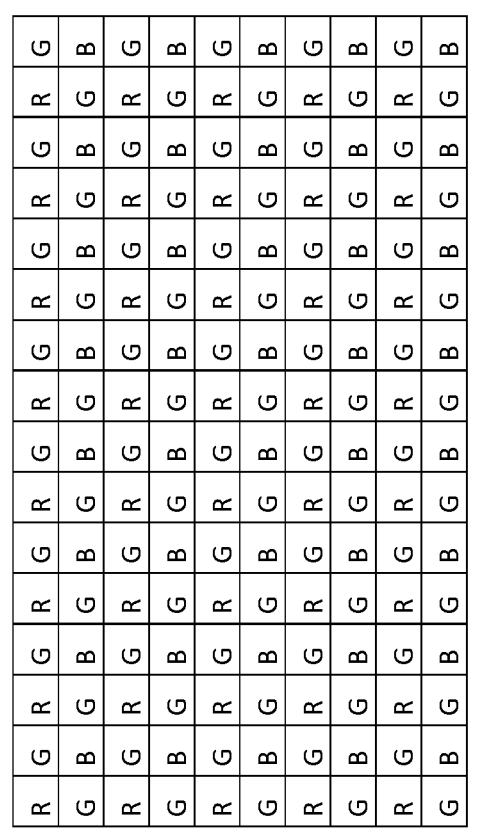

FIG. 1 shows a mosaic of pixels of a colour image sensor comprising colour pixels arranged according to the principle of a Bayer mosaic. The colour for a given pixel is represented by a letter on that pixel. The letter R denotes a red-coloured pixel, the letter G a green pixel, and the letter B a blue pixel. A pixel of a given colour collects a signal representing the component of that colour in the light received by the pixel. There are two green pixels, one red pixel and one blue pixel in an elementary pattern repeated in the mosaic.

In the prior art, an interpolation filter would typically be used to assign, to any pixel of any colour, three numerical values corresponding to the three colours. The filter is represented by a matrix of weighting coefficients. Typically, a 3×3 bilinear filter with nine coefficients is represented by the following matrix:

$$\begin{bmatrix} 1/4 & 1/2 & 1/4 \\ 1/2 & 1 & 1/2 \\ 1/4 & 1/2 & 1/4 \end{bmatrix}$$

The position of a coefficient in the filter represents the position of a pixel in a block of 3×3 pixels. The coefficient associated with a pixel position gets smaller as the position of the pixel gets further away from the centre pixel.

Any pixel is taken. The centre position in a block of 3×3 pixels is assigned thereto, i.e. the block is formed around this chosen pixel. The nine pixels of this block all deliver signals, each in its specific colour.

The sum of the values of signals delivered by the green pixels of the block is then assigned, as the green value Vg, to the centre pixel, each value being assigned the weighting coefficient which, in the matrix filter, corresponds to the position of the green pixel in the block.

Likewise, the sum of the values of signals delivered by the blue pixels of the block is assigned, as the blue value Vb, to the centre pixel, each value being assigned the weighting coefficient which, in the matrix filter, corresponds to the position of the blue pixel in the block.

Lastly, the sum of the values of the red pixels of the block is then assigned, as the red value Vr, to the centre pixel, each value being assigned the coefficient corresponding, in the matrix filter, to the position of the red pixel in the block.

Thus, any pixel of the mosaic, regardless of the colour to which it is sensitive, is given three levels of received light, corresponding to the three colours.

In the method according to the invention, interpolations from blocks of pixels centred on any pixel, and from a matrix of coefficients representing the weighting coefficients that must be assigned to each pixel of the block, are also carried out. However, the particularity of the invention lies in the manner in which the interpolation filter, in this instance two interpolation filters, is chosen, and in the manner in which the results of the two filtering operations carried out are combined.

The first interpolation filter, represented by a first matrix of coefficients, is obtained by convoluting a bilinear filter of size m×m (for example, m=3) and a low-pass filter of size n×n (for example, n=3). The low-pass filter is preferably a simple mean value filter represented by a matrix of coefficients all equal to ⅑. The coefficient ⅑ arises from the fact that there are nine pixels and that the sum of the signals must be divided by nine if it is desired to reduce it to a normalized value corresponding to one pixel.

$$\begin{bmatrix} 1/9 & 1/9 & 1/9 \\ 1/9 & 1/9 & 1/9 \\ 1/9 & 1/9 & 1/9 \end{bmatrix}$$

The second interpolation filter, represented by a second matrix of coefficients, is obtained by convoluting the same bilinear filter of size m×m and a high-pass filter, complementary to the low-pass filter, and of the same size n×n. The low-pass and high-pass filters are complementary in the sense that they have the same cutoff frequency. The high-pass filter is represented by the matrix of coefficients:

$$\begin{bmatrix} -1/9 & -1/9 & -1/9 \\ -1/9 & 8/9 & -1/9 \\ -1/9 & -1/9 & -1/9 \end{bmatrix}$$

The bilinear filter is preferably the simplest possible bilinear filter that is represented by the matrix:

$$\begin{bmatrix} 1/4 & 1/2 & 1/4 \\ 1/2 & 1 & 1/2 \\ 1/4 & 1/2 & 1/4 \end{bmatrix}$$

The principle of convoluting two matrices is recalled.

The convolution of a matrix m×m by a kernel matrix n×n (where n is odd) gives a matrix of (m+n−1)×(m+n−1). It is established in the following manner: the matrix m×m is extended by supplementing the m×m values with n−1 rows of zeros above, n−1 rows of zeros below, n−1 columns of zeros on the left, and n−1 columns of zeros on the right; next, for each of the points of a resulting matrix of (m+n−1)×(m+n−1) points, a block of n×n points, centred on a corresponding point of the extended matrix, is formed in the extended matrix, and the sum of the values of the n×n points of this block, which are weighted by the corresponding coefficients of the kernel matrix n×n, is calculated; this sum constitutes the value of the point in question of the matrix of (m+n−1)×(m+n−1) values.

Example

| Matrix m × m (3 × 3): | | | Kernel matrix n × n (3 × 3): | | |
|---|---|---|---|---|---|
| A | B | C | j | k | p |
| D | E | F | q | r | s |
| G | H | J | t | u | v |

Matrix m×m extended by rows and columns of zeros:

```
0 0 0 0 0 0 0
0 0 0 0 0 0 0
0 0 A B C 0 0
0 0 D E F 0 0
0 0 G H J 0 0
0 0 0 0 0 0 0
0 0 0 0 0 0 0
```

Result of the convolution: 5×5 matrix $$\begin{matrix} A' & B' & C' & D' & E' \\ F' & G' & H' & I' & J' \\ K' & L' & M' & N' & P' \\ Q' & R' & S' & T' & U' \\ V' & W' & X' & Y' & Z' \end{matrix}$$

where:

A'=the sum of the coefficients of the first block m×m on the left of the extended matrix (surrounded by a solid line) weighted by the coefficients of the kernel matrix m×m; A'=A×v B'=the sum of the coefficients of the next block to the right of the first (surrounded by a dotted line) weighted by the coefficients of the kernel matrix;

$$B'=A \times u + B \times v$$

$$C'=A \times t + B \times u + C \times v$$

etc. up to $Z'=k*J$, via $$M'=A \times j + B \times k + C \times p + D \times q + E \times r + F \times s + G \times t + H \times u + J \times v$$

This is a conventional convolution operation.

According to the invention, the convolution of a bilinear filter and of a low-pass filter is therefore carried out, resulting in an interpolation filter referred to as a low-frequency interpolation filter.

Likewise, the convolution of a bilinear filter and of a high-pass filter, complementary to the low-pass filter, is carried out, resulting in an interpolation filter referred to as a high-frequency interpolation filter.

The result of the conventions is then the following:

a) Low-Frequency Interpolation Filter:

$$\begin{bmatrix} 1/36 & 3/36 & 4/36 & 3/36 & 1/36 \\ 3/36 & 9/36 & 12/36 & 9/36 & 3/36 \\ 4/36 & 12/36 & 16/36 & 12/36 & 4/36 \\ 3/36 & 9/36 & 12/36 & 9/36 & 3/36 \\ 1/36 & 3/36 & 4/36 & 3/36 & 1/36 \end{bmatrix}$$

b) High-Frequency Interpolation Filter:

$$\begin{bmatrix} -1/36 & -3/36 & -4/36 & -3/36 & -1/36 \\ -3/36 & 0 & 6/36 & 0 & -3/36 \\ -4/36 & 6/36 & 20/36 & 6/36 & -4/36 \\ -3/36 & 0 & 6/36 & 0 & -3/36 \\ -1/36 & -3/36 & -4/36 & -3/36 & -1/36 \end{bmatrix}$$

Figure 2:
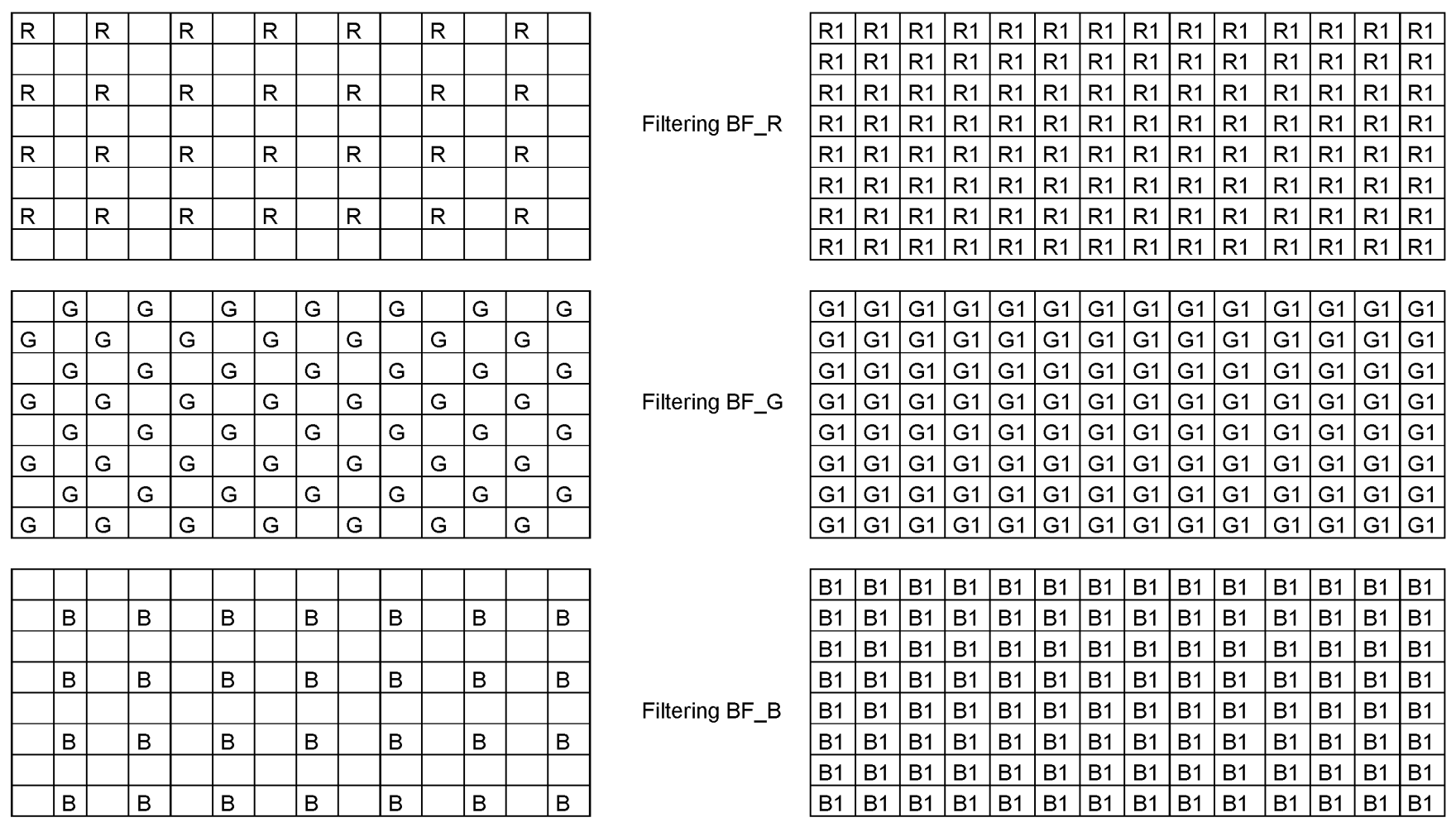

These are 5×5 filters if starting from a 3×3 bilinear filter and a 3×3 low-pass filter. The interpolation of all of the pixels of the mosaic is carried out by the low-frequency interpolation filter (FIG. 2), for each of the respective colours, in order to give, to each of the pixels and regardless of the colour to which it is sensitive, a first red numerical value R1, a first green numerical value G1, and a first blue numerical value B1. These numerical values result from the signals (R for red, G for green, B for blue) detected by the 25 pixels of the block and the corresponding coefficients of the matrix. The interpolation is therefore carried out colour by colour. In practice, and this is an advantage of the invention, this interpolation by the low-frequency interpolation filter is calculated in a single pass, since, in each position of the filter, the colour being processed is known, which is the colour of the pixel on which the filter is centred.

Figure 3:
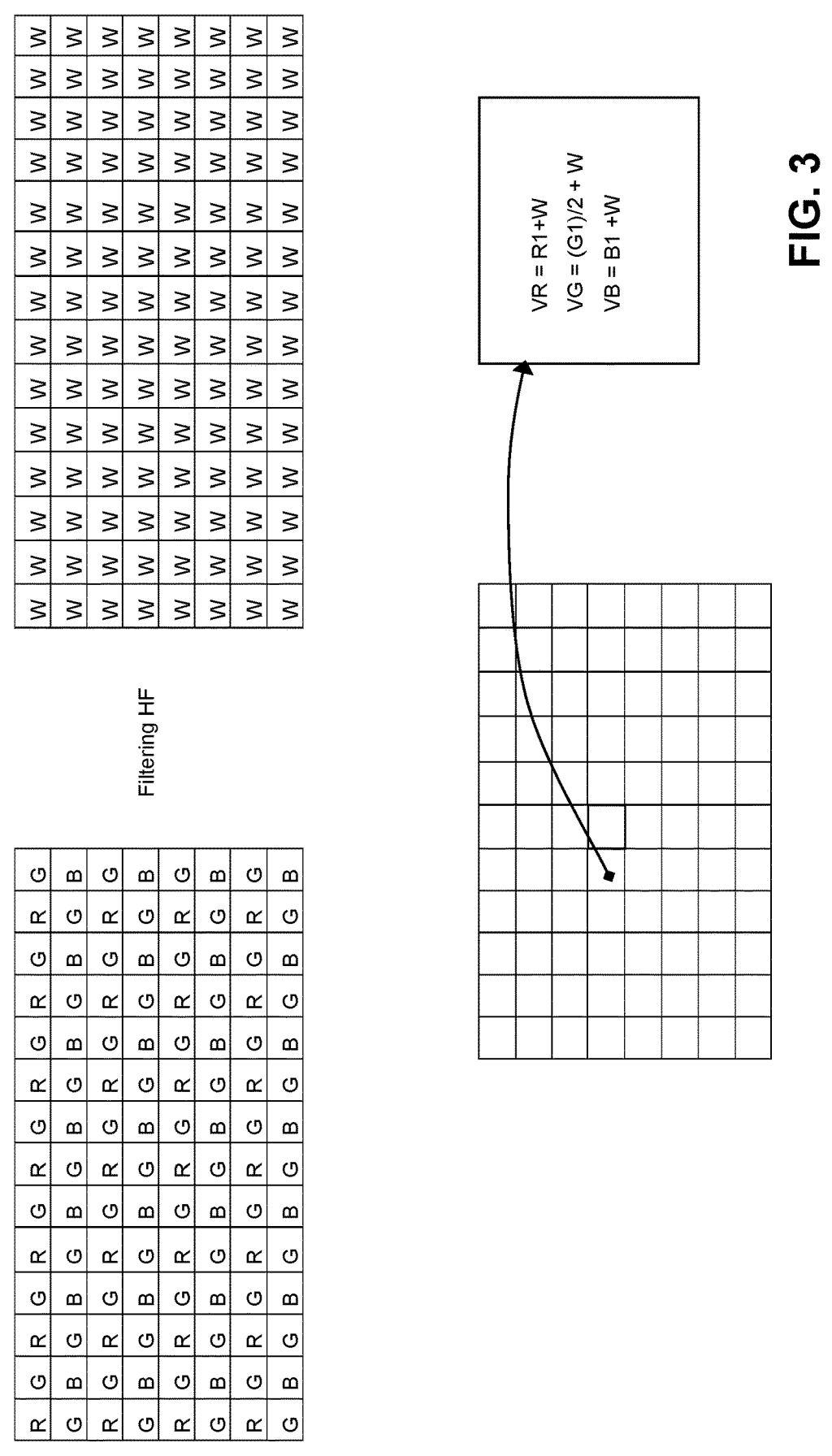

Furthermore, the interpolation (FIG. 3) of all of the pixels of the mosaic is carried out by the high-frequency interpolation filter, without taking the colour into account, in order to give, to each of the pixels and regardless of the colour to which they are sensitive, a second numerical value W. This second numerical value, assigned to any pixel, results from the weighted sum of the signals detected by the 25 pixels of the 5×5 block formed around the pixel in question. The weighting is that of the matrix above, representing the high-frequency interpolation filter, in which the weighting coefficient used for one pixel of the block is that which, in the matrix, corresponds to the position of that pixel in the block.

Then, in order to give a final red numerical value to any pixel, the second numerical value of that pixel is added to the first red numerical value of that pixel. Likewise, the second numerical value of the pixel is added to the first green numerical value of that pixel in order to obtain a final green value. Likewise again, the second numerical value of the pixel is added to the first blue numerical value of that pixel in order to obtain a final blue value.

It should be noted that if there are more green pixels than red or blue pixels, as is generally the case with Bayer matrices, provision will be made for the low-frequency filter for the colour green to be assigned a coefficient of ½ so that it has the same weight as the other colours.

The final numerical values VR, VG, VB assigned to a pixel for the three colours are therefore, respectively:

$$VR = R1 + W$$

$$VG = (G1)/2 + W$$

$$VB = B1 + W$$

The invention claimed is:

1. A method for processing the image delivered by a colour image sensor comprising a mosaic of N coloured pixels arranged in a regular geographic distribution of three colours in which each pixel is associated with one point of the image to be established, each pixel delivering a digital signal whose value represents the luminance component of an image point in the colour corresponding to that pixel, the signals arising from the N pixels being arranged in a matrix and the image processing operation comprising a calculation of interpolating signals of the matrix, allowing each image point to be given three numerical values of luminance components corresponding to the three colours, respectively, while the pixel corresponding to that image point delivers a signal corresponding to a single colour, the method comprising the following steps:

defining a first elementary matrix filter, which is a bilinear interpolation filter, of size m×m, m being an odd number larger than or equal to 3;

defining a low-pass matrix filter of size n×n, n being an odd number larger than or equal to 3;

defining a high-pass matrix filter, complementary to the low-pass filter, of size n×n;

convoluting the first elementary matrix filter with the low-pass filter, resulting in a low-frequency interpolation filter of size (m+n−1)×(m+n−1);

convoluting the first elementary matrix filter with the high-pass filter, resulting in a high-frequency interpolation filter of size (m+n−1)×(m+n−1);

filtering the matrix of digital signals, using the pixels of the first colour only, with the low-frequency interpolation filter, filtering the matrix of pixels, using the pixels of the second colour only, with the low-frequency interpolation filter, and filtering the matrix of pixels, using the pixels of the third colour only, with the low-frequency interpolation filter, these three filtering operations resulting in a first intermediate numerical value being given to each point of the image for each of the colours;

filtering the entire matrix of pixels with the high-frequency interpolation filter, without taking the colours into account, in order to establish a second intermediate numerical value for each point of the image;

adding, for each pixel, in order to obtain a numerical value of a given colour of that pixel, the first intermediate numerical value corresponding to that pixel and to that colour and the second numerical value corresponding to that pixel.

2. The method of claim 1, wherein the size of the first elementary matrix filter is 3×3 and it is represented by the following matrix:

$$\begin{bmatrix} 1/4 & 1/2 & 1/4 \\ 1/2 & 1 & 1/2 \\ 1/4 & 1/2 & 1/4 \end{bmatrix}.$$

3. The method of claim 2, wherein the low-pass matrix filter is a simple mean filter, of size 3×3, and is represented by the following matrix:

$$\begin{bmatrix} 1/9 & 1/9 & 1/9 \\ 1/9 & 1/9 & 1/9 \\ 1/9 & 1/9 & 1/9 \end{bmatrix}$$

and the high-pass filter is represented by the following matrix:

$$\begin{bmatrix} -1/9 & -1/9 & -1/9 \\ -1/9 & 8/9 & -1/9 \\ -1/9 & -1/9 & -1/9 \end{bmatrix}.$$

4. The method of claim 2, wherein in the case in which the pixels of one determined colour have a pitch of geographic distribution that is twice smaller than the pitch of the pixels of the other colours, the filtering of the matrix of pixels using the pixels of this determined colour with the low-frequency interpolation filter is followed by a division by two in order to deliver the first intermediate value for that colour.

5. The method of claim 1, wherein the low-pass matrix filter is a simple mean filter, of size 3×3, and is represented by the following matrix:

$$\begin{bmatrix} 1/9 & 1/9 & 1/9 \\ 1/9 & 1/9 & 1/9 \\ 1/9 & 1/9 & 1/9 \end{bmatrix}$$

and the high-pass filter is represented by the following matrix:

$$\begin{bmatrix} -1/9 & -1/9 & -1/9 \\ -1/9 & 8/9 & -1/9 \\ -1/9 & -1/9 & -1/9 \end{bmatrix}.$$

6. The method of claim 5, wherein in the case in which the pixels of one determined colour have a pitch of geographic distribution that is twice smaller than the pitch of the pixels of the other colours, the filtering of the matrix of pixels using the pixels of this determined colour with the low-frequency interpolation filter is followed by a division by two in order to deliver the first intermediate value for that colour.

7. The method of claim 1, wherein in the case in which the pixels of one determined colour have a pitch of geographic distribution that is twice smaller than the pitch of the pixels of the other colours, the filtering of the matrix of pixels using the pixels of this determined colour with the low-frequency interpolation filter is followed by a division by two in order to deliver the first intermediate value for that colour.

8. A method for processing the image delivered by a colour image sensor comprising a mosaic of N coloured pixels arranged in a regular geographic distribution of three colours in which each pixel is associated with one point of the image to be established, each pixel delivering a digital signal whose value represents the luminance component of an image point in the colour corresponding to that pixel, the digital signals arising from the N pixels being arranged in a matrix and the image processing operation comprising an interpolation calculation allowing each image point to be given three numerical values of luminance components corresponding to the three colours, respectively, while the pixel corresponding to this image point delivers a signal corresponding to a single colour, the method comprising the following steps:

defining a low-frequency interpolation filter of size 5×5, represented by the following matrix:

$$\begin{bmatrix} 1/36 & 3/36 & 4/36 & 3/36 & 1/36 \\ 3/36 & 9/36 & 12/36 & 9/36 & 3/36 \\ 4/36 & 12/36 & 16/36 & 12/36 & 4/36 \\ 3/36 & 9/36 & 12/36 & 9/36 & 3/36 \\ 1/36 & 3/36 & 4/36 & 3/36 & 1/36 \end{bmatrix}$$

defining a high-frequency interpolation filter of size 5×5 represented by the following matrix:

$$\begin{bmatrix} -1/36 & -3/36 & -4/36 & -3/36 & -1/36 \\ -3/36 & 0 & 6/36 & 0 & -3/36 \\ -4/36 & 6/36 & 20/36 & 6/36 & -4/36 \\ -3/36 & 0 & 6/36 & 0 & -3/36 \\ -1/36 & -3/36 & -4/36 & -3/36 & -1/36 \end{bmatrix}$$

filtering the matrix of signals, using the pixels of the first colour only, with the low-frequency interpolation filter, filtering the matrix of signals, using the pixels of the second colour only, with the low-frequency interpolation filter, and filtering the matrix of signals, using the pixels of the third colour only, with the low-frequency interpolation filter, these three filtering operations resulting in a first intermediate numerical value being given to each point of the image for each of the colours;

filtering the entire matrix of signals with the high-frequency interpolation filter, in order to establish a second intermediate numerical value for each point of the image;

for each pixel, adding, in order to obtain a numerical value of a given colour of that pixel, the first intermediate numerical value corresponding to that pixel and to that colour and the second numerical value corresponding to that pixel.

9. A colour image sensor comprising a mosaic of N coloured pixels arranged in a regular geographic distribution of three colours in which each pixel is associated with one point of the image to be established, each pixel delivering a digital signal whose value represents the luminance component of an image point in the colour corresponding to that pixel, the digital signals arising from the N pixels being arranged in a matrix and the image processing operation comprising an interpolation calculation allowing each image point to be given three numerical values of luminance components corresponding to the three colours, respectively, while the pixel corresponding to that image point delivers a signal corresponding to a single colour, the sensor comprising:

means for filtering the matrix of signals, using the pixels of the first colour only, with a low-frequency interpolation filter, filtering the matrix of signals, using the pixels of the second colour only, with the low-frequency interpolation filter, and filtering the matrix of signals, using the pixels of the third colour only, with the low-frequency interpolation filter, these three filtering operations resulting in a first intermediate numerical value being given to each point of the image for each of the colours;

means for filtering the entire matrix of signals with a high-frequency interpolation filter, in order to establish a second intermediate numerical value for each point of the image;

means for adding in order to obtain, for each pixel, a numerical value of a given colour of that pixel which is the sum of the first intermediate numerical value corresponding to that pixel and to that colour and the second numerical value corresponding to that pixel;

the low-frequency interpolation filter of size 5×5, being represented by the following matrix:

$$\begin{bmatrix} 1/36 & 3/36 & 4/36 & 3/36 & 1/36 \\ 3/36 & 9/36 & 12/36 & 9/36 & 3/36 \\ 4/36 & 12/36 & 16/36 & 12/36 & 4/36 \\ 3/36 & 9/36 & 12/36 & 9/36 & 3/36 \\ 1/36 & 3/36 & 4/36 & 3/36 & 1/36 \end{bmatrix}$$

and the high-frequency interpolation filter of size 5×5 being represented by the following matrix:

$$\begin{bmatrix} -1/36 & -3/36 & -4/36 & -3/36 & -1/36 \\ -3/36 & 0 & 6/36 & 0 & -3/36 \\ -4/36 & 6/36 & 20/36 & 6/36 & -4/36 \\ -3/36 & 0 & 6/36 & 0 & -3/36 \\ -1/36 & -3/36 & -4/36 & -3/36 & -1/36 \end{bmatrix}.$$

* * * * *